United States Patent
Park

(10) Patent No.: US 6,672,667 B1
(45) Date of Patent: Jan. 6, 2004

(54) ANTI-SUBMARINE SEAT FOR AN AUTOMOBILE

(75) Inventor: Min Kyu Park, Kyungki-Do (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 10/321,093

(22) Filed: Dec. 16, 2002

(30) Foreign Application Priority Data

Jun. 15, 2002 (KR) .......................................... 2002-33491

(51) Int. Cl.$^7$ ................................................. A47C 1/02
(52) U.S. Cl. ............................... 297/344.1; 297/216.16; 297/216.1; 297/216.17; 297/216.19
(58) Field of Search .................. 297/216.11, 216.15, 297/216.16, 216.1, 284.11, 344.1, 216.19, 216.2; 267/160, 163, 131, 120

(56) References Cited

U.S. PATENT DOCUMENTS

| | | | | |
|---|---|---|---|---|
| 2,799,323 A | * | 7/1957 | Berg | 297/312 |
| 4,045,008 A | * | 8/1977 | Bauer | 267/120 |
| 4,128,217 A | * | 12/1978 | Mazelsky | 244/122 R |
| 4,830,345 A | * | 5/1989 | Mar | 267/133 |
| 5,386,975 A | * | 2/1995 | Wallis | 267/119 |
| 5,524,967 A | * | 6/1996 | Glockl | 297/314 |
| 5,556,160 A | * | 9/1996 | Mikami | 297/216.1 |
| 5,567,007 A | * | 10/1996 | Czernakowski et al. | 297/250.1 |
| 5,590,930 A | * | 1/1997 | Glockl | 297/313 |
| 6,257,663 B1 | * | 7/2001 | Swierczewski | 297/216.19 |
| 2002/0021036 A1 | * | 2/2002 | Jonas et al. | 297/284.11 |

* cited by examiner

Primary Examiner—Peter M. Cuomo
Assistant Examiner—Erika Garrett
(74) Attorney, Agent, or Firm—Pennie & Edmonds LLP

(57) ABSTRACT

The present invention discloses an anti-submarine seat for an automobile. The anti-submarine seat prevents the occupant pelvis from slipping forward during a collision. The present invention discloses installing spring-type actuator means at a lower portion of a seat cushion so as to raise a front end of the seat cushion and to descend the rear end of the seat cushion at the time of an impact.

9 Claims, 3 Drawing Sheets

ANTI-SUBMARINE SEAT FOR AN AUTOMOBILE

FIELD OF THE INVENTION

The present invention relates to a seat for an automobile. More particularly, the present invention relates to an anti-submarine seat for an automobile capable of preventing the pelvis of a user from sliding forward during a collision.

BACKGROUND OF THE INVENTION

There are many safety devices for the occupants of a vehicle, such as, seat belts, air bags, and the like. Typically the seat belt and the air bag are disposed between a passenger seat and a dashboard of the vehicle. The seat belt and the air bag function to restrain the upper body of the passenger during a collision such that injury to the passenger is potentially reduced.

However, a drawback associated with these devices is that the safety of the occupants is not entirely considered. For example, the so-called 'submarine phenomenon' occurs during many impacts, such as in vehicle collisions. This phenomenon is typified by the pelvis of an automobile occupant sliding forward, under a seat belt. This leads to injury in the leg region from collision with a lower end of a crash pad and to injury in the abdomen region from tension of the seat belt.

A submarine phenomenon preventing mechanism that raises the front end of the seat cushion is known in the art. However, the conventional submarine phenomenon preventing mechanism adversely effects the ergonomics of the automobile seat. Therefore, the occupant may be guarded from the submarine phenomenon injury, however they suffer from poor ergonomics, reduced comfort, and potential injury to the knees during long distance travel.

SUMMARY OF THE INVENTION

Embodiments of the present invention provide an anti-submarine seat for an automobile that reduces the chance of the pelvis of an automobile occupant from slipping forward during a collision. By installing a spring-type actuator means at a lower portion of a seat cushion, so as to raise a front end of the seat cushion and to descend a rear end of the seat cushion, the submarine phenomenon is potentially reduced.

An anti-submarine seat for an automobile according to an embodiment of the present invention comprises a spring-type actuators for elastically supporting a front end and a rear end of the seat cushion of the automobile. The actuators being installed at a lower portion of the seat cushion. The actuators urge the front end of the seat cushion upwards and simultaneously descend the rear end of the seat cushion in case of an impact situation such as a vehicle crash.

The actuators include a cylindrical upper housing installed at an upper seat frame and a cylindrical lower housing installed at a lower seat frame. A spring and a spring seat are installed in the lower housing or in the upper housing. The spring and the spring seat are fixed in the lower housing or in the upper housing by means of a wedge-shaped spring fixing pin so that operation of the spring is selectively controlled.

In a preferred embodiment, the actuator is installed at the front end of the seat cushion and the spring is installed in the lower housing. In an alternative embodiment, when the actuator is installed at the rear end of the seat cushion the spring is installed in the upper housing. When the seat belt is stretched tight, such as in the event of a collision, the actuator is activated to maneuver the springs of the anti-submarine seat.

BRIEF DESCRIPTION OF THE DRAWINGS

The objects and advantages of the present invention will be better understood by reference to the following detailed description, which should be read in conjunction with the accompanying drawings in which.

DETAILED DESCRIPTION OF THE INVENTION

Figure 1:
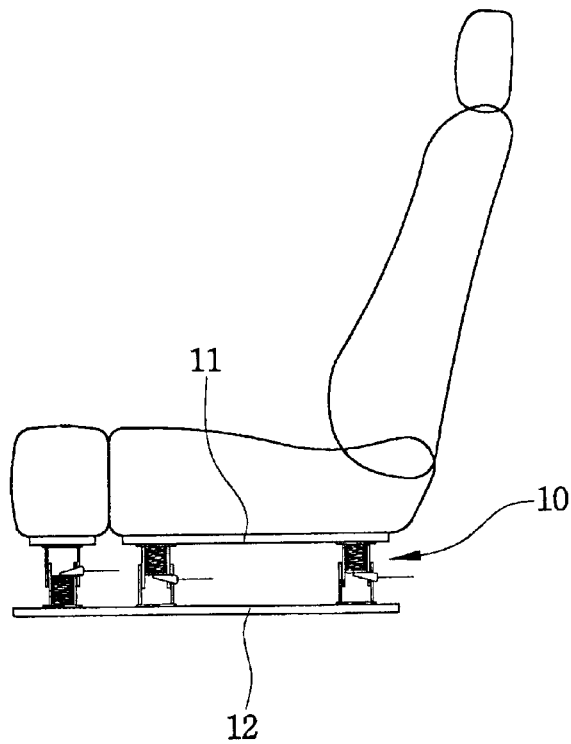
FIG. 1 is a side view of an embodiment of an anti-submarine seat for an automobile according to an embodiment of the present invention.

As shown in FIG. 1, an embodiment of the anti-submarine seat for an automobile includes an upper seat frame 11 fixedly attached to a bottom portion of a seat cushion. Also shown is a lower seat frame 12 mounted to the floor of the automobile. Spring-type actuators 10 for supporting the seat cushions are interposed between the upper seat frame 11 and the lower seat frame 12.

Figure 2:
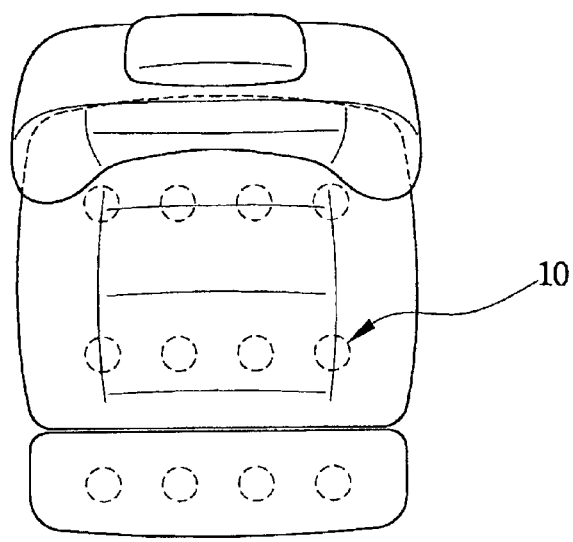
FIG. 2 is a top plan view of the anti-submarine seat of FIG. 1.

FIG. 2 shows the actuators 10 equally disposed over the total sectional area of the seat cushion. In a preferred embodiment, about four actuators 10 are disposed at a front end of the seat cushion and about eight actuators 10 are disposed at the rear end of the seat cushion.

Figure 3A:
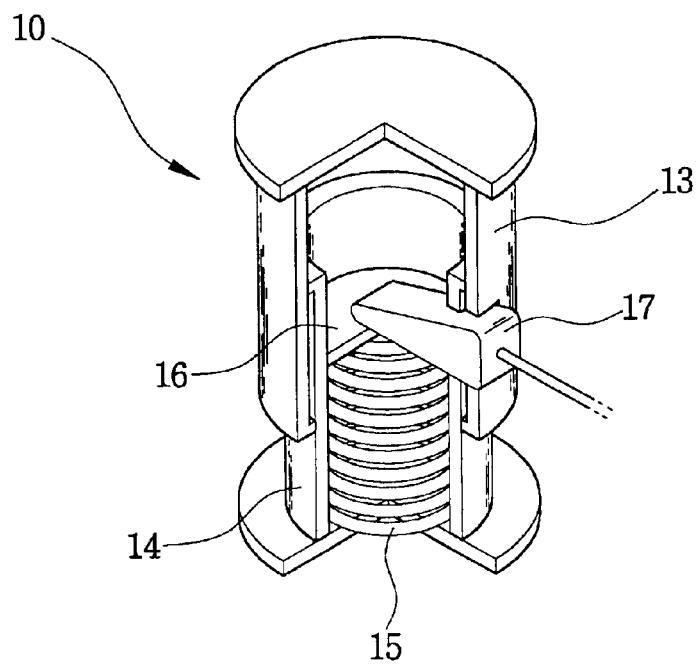
FIGS. 3a and 3b are enlarged perspective views of an embodiment of the anti-submarine mechanism of an embodiment of the present invention.
Figure 3B:
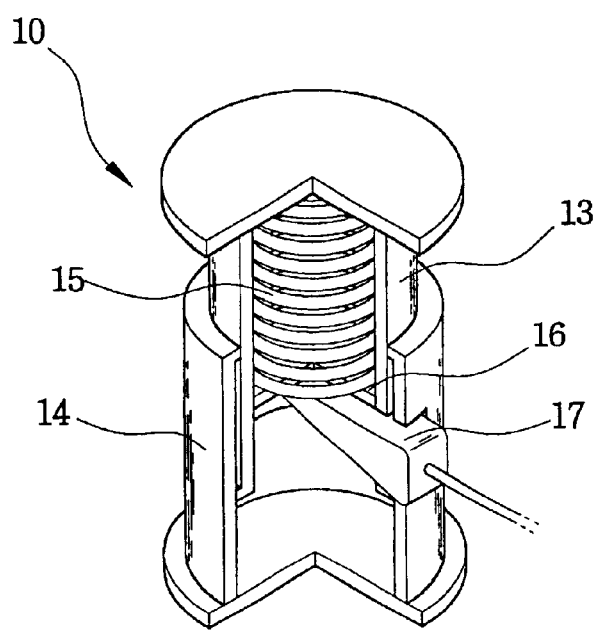

Referring to FIGS. 3a and 3b, the actuator 10 includes a cylindrical upper housing 13. The cylindrical upper housing 13 is configured to be coupled with the lower surface of the upper frame 11 of the seat bottom. A cylindrical lower housing 14 slidably interacts with the cylindrical upper housing 13 and is configured to be coupled to the an upper surface of the lower seat frame 12. In a preferred embodiment the lower housing 14 is inserted into the upper housing 13, FIG. 3a. In an alternative embodiment the upper housing 13 is inserted into the lower housing 14, FIG. 3b.

A spring 15 and a spring seat 16 are included in the actuator 10. The spring 15 and the spring seat 16 can be installed in either the lower housing 14 or in the upper housing 13. The spring 15 and the spring seat 16 are fixed in the lower housing 14 or in the upper housing 13 by means of a wedge-shaped spring fixing pin 17. The wedge-shaped spring fixing pin 17 is configured to selectively control the actuator 10.

As shown in FIG. 3a, when the actuator 10 is installed at the front end of the seat cushion, the spring 15 and the spring seat 16 are installed in the lower housing 14. The wedge-shaped spring fixing pin 17 is disposed at a position above the spring 15 and the spring seat 16. In use, when the wedge-shaped spring fixing pin 17 is released by the actuator 10, the elastic force of the spring 15 acts to push the spring seat 16 upwards.

In the alternative embodiment shown in FIG. 3b, where the actuator 10 is installed at the rear end of the seat cushion, the spring 15 and the spring seat 16 are installed in the upper housing 13. The wedge-shaped spring fixing pin 17 is disposed at a position below the spring 15 and the spring seat 16. In use, when the wedge-shaped spring fixing pin 17 is released by the actuator 10, the elastic force of the spring 15 acts to force the spring seat 16 downwards.

Figure 4:
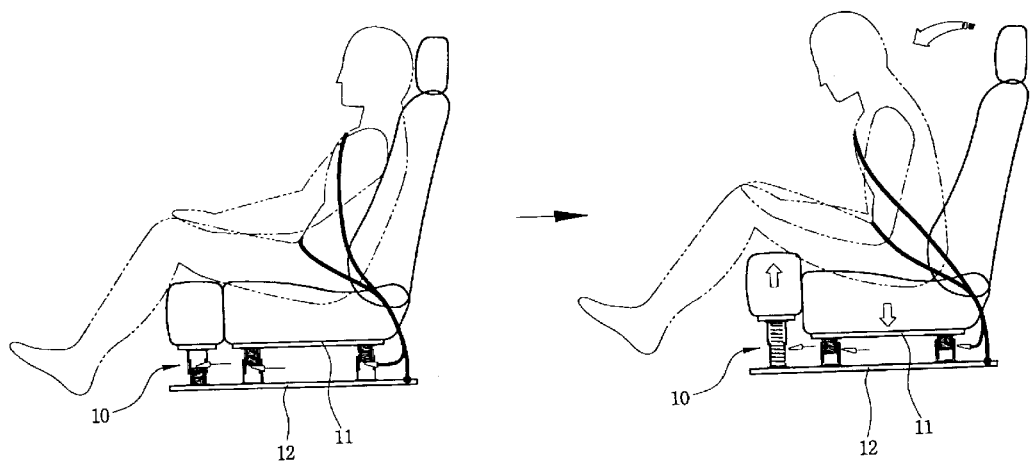
FIG. 4 is a side view of an embodiment of the anti-submarine seat for the automobile showing an operational state of the anti-submarine seat according to an embodiment of the present invention.

In a preferred embodiment the wedge-shaped spring fixing pin 17 is connected to a seat belt, FIG. 4. The wedge-shaped spring fixing pin 17 disengages form the actuator 10 in accordance with movement of the seat belt. Thus, when the seat belt is stretched tight, as during a collision, the wedge-shaped spring fixing pin 17 disengages from the actuator 10.

Hereinafter, the operation of an embodiment of the anti-submarine seat for the automobile according to an embodiment of the present invention will be described in detail with reference to the drawings.

FIG. 4 shows the anti-submarine seat of an embodiment of the present invention in use. In the case of a collision, when the occupant stretches the seatbelt tightly, the wedge-shaped spring fixing pin 17 disengages from the upper housing 13. This prompts the spring 15 of the actuators 10 located at the front end of the seat (toward the knees of the passenger) to extend upwards and the springs of the actuators 10 located under the occupants seat bottom to descend downwards. Therefore, the front end of the seat cushion rises and the rear end of the seat cushion drops down. This helps restrict the occupants pelvis region from slipping forward during a collision.

While the present invention has been described with reference to a particular embodiment thereof, it will be understood by those skilled in the art that various changes in form and detail may be effected without departing from the spirit and scope of the invention. The scope of the invention is not intended to be defined by the above description of particular embodiments but is intended to be defined by the appended claims.

What is claimed is:

1. An anti-submarine seat for an automobile, comprising spring-type actuators elastically supporting a front end and a rear end of a seat cushion of an automobile, the actuators being installed at a lower portion of the seat cushion, wherein the actuators urge the front end of the seat cushion upwards and simultaneously descend the rear end of the seat cushion in response to an impact due to a collision and wherein the actuators comprise;

a cylindrical upper housing installed at a lower surface of an upper seat frame of the seat cushion;

a cylindrical lower housing installed at an upper surface of the lower seat frame of a floor of an automobile; and a spring and a spring seat installed in the lower or upper housing, wherein the spring and the spring seat are fixed in the lower or upper housing by means of a wedge-shaped spring fixing pin in the actuator so that an operation of the spring is selectively controlled.

2. An anti-submarine seat for an automobile, comprising spring-type actuators elastically supporting a front end and a rear end of a seat cushion of an automobile, the actuators being installed at a lower portion of the seat cushion, wherein the actuators urge the front end of the seat cushion upwards and simultaneously descend the rear end of the seat cushion in response to an impact due to a collision and wherein a spring is installed in a lower housing of the actuators installed at the front end of the seat cushion, and the spring is installed in an upper housing of the actuators installed at the rear end of the seat cushion.

3. An anti-submarine seat for an automobile, comprising spring-type actuators elastically supporting a front end and a rear end of a seat cushion of an automobile, the actuators being installed at a lower portion of the seat cushion, wherein the actuators urge the front end of the seat cushion upwards and simultaneously descend the rear end of the seat cushion in response to an impact due to a collision and wherein the actuators are activated by applying a force to a seat belt.

4. A anti-submarine seat for an automobile, comprising:

a vehicle seat configured with a front lower seat portion and a rear lower seat portion wherein said front lower seat portion is positioned moveably adjacent to said rear lower seat portion;

a plurality of first actuators coupled between a frame of said first lower seat portion and the floor of the automobile and configured to translate said first lower seat portion upward following activation; and a plurality of second actuators coupled between a frame of said rear lower seat portion and the floor of the automobile and configured to translate said rear lower seat portion downward following activation.

5. The seat of claim 4, further comprising actuator pins configured to activate said first and said second activators following a stimulus.

6. The seat of claim 4, further comprising seat belts attached near one end to said activator pins.

7. The seat of claim 5, wherein said stimulus is tension applied to said seat belt from an occupant during a collision.

8. The anti-submarine seat of claim 1, wherein the spring is installed in the lower housing of the actuators installed at the front end of the seat cushion, and the spring is installed in the upper housing of the actuators installed at the rear end of the seat cushion.

9. The anti-submarine seat of claim 1, wherein the actuators are activated by applying a force to a seat belt.

* * * * *